United States Patent [19]

Hoff

[11] 4,221,284
[45] Sep. 9, 1980

[54] CLUTCH AND BRAKE ASSEMBLY FOR IMPLEMENT DRIVE

[75] Inventor: Stephen J. Hoff, Richmond, Ind.

[73] Assignee: Hoffco Inc., Richmond, Ind.

[21] Appl. No.: 892,499

[22] Filed: Apr. 3, 1978

Related U.S. Application Data

[62] Division of Ser. No. 659,350, Feb. 19, 1976, Pat. No. 4,088,210.

[51] Int. Cl.² ............................................. F16D 41/02
[52] U.S. Cl. .................................. 192/12 BA; 192/26; 192/17 D
[58] Field of Search ................... 192/12 BA, 26, 48.3, 192/48.92, 17 D, 12 R, 17 R, 48.1, 56 R; 64/30 R, 30 C

[56] References Cited

U.S. PATENT DOCUMENTS

| | | | |
|---|---|---|---|
| 2,659,220 | 11/1949 | Cherry | 64/30 R X |
| 2,857,750 | 10/1958 | Fox | 64/30 C |
| 3,004,646 | 10/1961 | Seiden | 192/17 D |
| 3,092,983 | 6/1963 | Huber | 64/30 C |
| 3,201,953 | 8/1965 | Firth | 64/30 R |
| 3,315,773 | 4/1967 | Aschauer | 192/48.3 |
| 3,319,751 | 5/1967 | Sacchini | 192/48.92 |
| 3,905,458 | 9/1975 | Mehrbrodt | 192/26 |
| 4,055,935 | 11/1977 | Malion | 192/12 BA |
| 4,076,109 | 2/1978 | Bencini | 64/30 R |

*Primary Examiner*—George H. Krizmanich
*Attorney, Agent, or Firm*—Jenkins, Coffey, Hyland, Badger & Conard

[57] ABSTRACT

A coil spring clutch connects a driving hub to a driven sleeve rotatable on the hub and the sleeve drives an output or second driven member through a torque limiting clutch. The spring is readily declutched by arresting rotation of its leading end, as by interposing a stop in the path of an out-turned tang on that end, and is re-engaged by releasing the leading end. Re-engagement is characteristically abrupt and harsh, and the torque-limiting clutch in series with the spring clutch limits torque stress on the spring so that the series assembly is usable in applications which would destroy the spring clutch alone. The torque-limiting clutch may be a spring-biased friction clutch. The driven members are desirably mounted on the driving hub in a compact unitary assembly.

1 Claim, 2 Drawing Figures

CLUTCH AND BRAKE ASSEMBLY FOR IMPLEMENT DRIVE

This is a division of application Ser. No. 659,350, filed Feb. 19, 1976 now U.S. Pat. No. 4,088,210.

BACKGROUND OF THE INVENTION

This invention relates to a clutch combination especially adapted for use in the drive train of small horsepower power-driven implements, such as garden tractors, snowblowers, cultivators, mowers, and the like.

In such power-driven implements, it is in some cases necessary, and often desirable, to quickly disengage the drive train either to the propelling wheels of the implement or to the blade or other operating part of the implement. Coil spring clutches are advantageous for such disengagement, because they provide a quick declutching action with the use of a relatively simple and lightly loaded actuating device. Such clutches comprise, for example, a coil spring surrounding and frictionally engaged with aligned cylindrical clutch faces on coaxial driving and driven clutch members. The springg is wound of such a hand in relation to the forward driving direction of the clutch that the driving torque tends to wind the spring into tighter engagement with such clutch faces. The clutch is released by simply arresting the rotation of the leading end of the clutch spring, as by projecting a stop into the path of an out-turned tang on such leading end.

While such clutches are advantageous for their simple and inexpensive construction and their effective and quick release, they also have the serious disadvantage that re-engagement of the clutch is abrupt and harsh and imposes shock loads on the spring, so that such clutches cannot be used where they must be engaged under load.

The present invention provides a combination clutch which is of simple, compact, and inexpensive construction and provides a unitary assembly which may be embodied as such in the drive train of various implements. The combination provides all the advantages of the coil clutch, particularly its quick release with a simple actuator. It avoids the disadvantages of the coil clutch and provides a soft engagement which limits the torque load imposed on the coil spring as engagement occurs and which permits a variety of engagement characteristics. The assembly may also provide the speed-responsive engagement features commonly required in the propulsion drive train of a self-propelled vehicle, such as a self-propelled snowblower, garden tractor and the like. It may also be combined with a brake which may serve as a brake for the vehicle or may provide a safety control which, for example, stops the blade of a lawn mower or snowblower in response to release of a dead-man control. The coil spring clutch release mechanism may be actuated in common with, or in response to, the actuation of the brake. For other applications, especially low-speed applications, the combination may include a friction clutch which serves primarily to limit the torque transmitted through the drive train, both to protect the coil spring clutch from excessive loads as the clutch is engaged, and to protect the drive train from damage in the event the driven element strikes some obstruction.

SUMMARY OF THE INVENTION

In accordance with the invention, the clutch comprises a driving element, preferably in the form of a hub adapted to be fixed on a drive shaft. A first driven element, preferably in the form of a sleeve, is rotatably mounted on the hub, and the sleeve and hub are formed with cylindrical clutch faces of equal diameter in substantially end-to-end relation, and a helical clutch spring is placed about such faces in overlapping relation with both. The spring is wound of such a hand that in forward drive it tends to wind in a direction to reduce its diameter and cause it to grip the two clutch faces of the hub and first driven member to clutch them together. This places the leading end of the spring on the hub and such leading end is provided with an out-turned tang by which the leading end can be arrested from rotation to disengage the clutch from the rotating hub. A second driven member is mounted in coaxial relation with the hub and first driven sleeve, preferably on the hub, and a secondary clutch is interposed between the first driven member and the second driven member. Such secondary clutch has torque-limiting properties and may take any of a number of forms.

A clutch combination embodying a form of secondary clutch between the first and second driven members of the combination is one in which the output or second driven member is rotatably mounted on the first driven member or sleeve and is frictionally clutched thereto as by friction plates pressed against the side faces of the output member. This limits the shock loads which can be imposed on the coil spring during its engagement and also on other parts of the drive train during operation. This form of clutch combination may also be combined with a brake, as to hold a driven member such as a snowblower auger from rotation during self-propelled transport of the implement.

BRIEF DESCRIPTION OF THE DRAWINGS

The accompanying drawings illustrate the invention and show a preferred embodiment. In such drawings.

Figure 1:
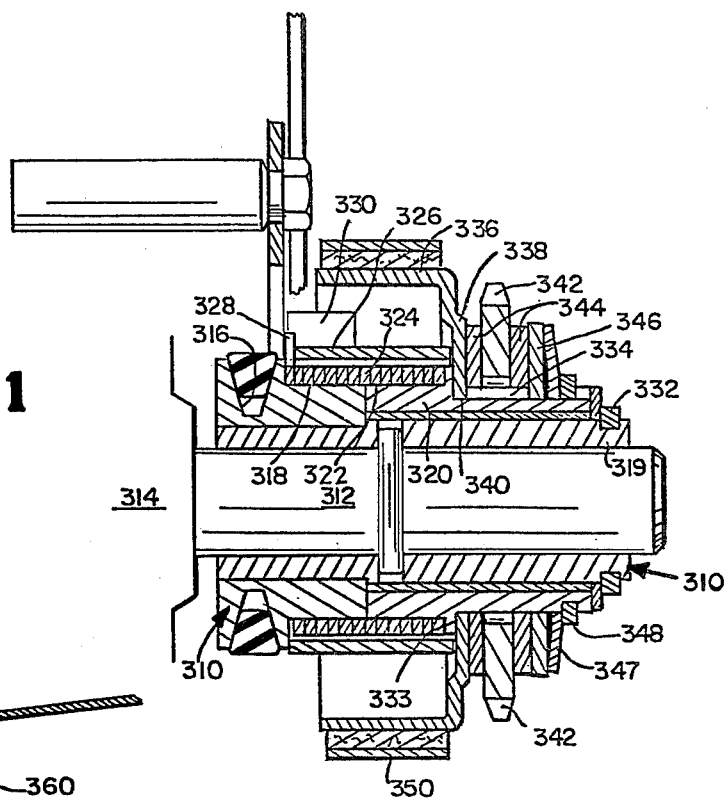
FIG. 1 is an axial section of a clutch combination including a friction clutch between the first and second driven members and including also a pulley groove in the driving hub.

The clutch mechanism shown in the drawing comprises a hub 310 shown mounted on the output shaft 312 of a gear box 314 which is assumed to be driven through a suitably controlled drive train from an engine (not shown). The hub 310 has a pulley groove 316 at its inner end for belt connection to the wheel drive of an implement such as a snowblower. The hub 310 has a cylindrical clutch face 318 adjacent the pulley groove, and has a reduced outer portion 319 on which a first driven member or sleeve 320 is rotatably mounted and retained by a snap ring 332. The sleeve 320 has a cylindrical clutch face 322 in alignment with and adjacent to the clutch face 318 of the hub. A coil clutch spring 324 surrounds these clutch faces 318 and 322 and overlaps both so as to normally clutch the hub and the first driven member together. The spring is surrounded by a release sleeve or collar 326 provided with a notch which receives an out-turned tang 328 on the leading end of the spring 324, and which carries a wing 330 by which the rotation of the release collar can be stopped.

The first driven member or sleeve 320 carries both a brake drum 336 and a sprocket 342 which forms a secondary driven member and output element. The sleeve 320 has a shoulder intermediate its length, at the end of the clutch face 322, and the outer end of the sleeve is formed with one or more axial slots or keyways 334. The brake drum 336 is mounted by its web 338 on the sleeve 320 and against the shoulder 333, and has inward extending tongues 340 engaged in the keyways 334 to hold the drum against rotation on the sleeve 320. The sprocket 342 is rotatably mounted on the sleeve 320 and is engaged on opposite sides by friction washers 344 clamped between the web 338 of the brake drum 336 and a pressure plate 346 slidably mounted on the sleeve 320 and held from rotation thereon by inward extending tongues engaged in the slots 334 of the sleeve. The pressure plate 346 is biased toward the web 338 of the brake drum by one or more Bellville washers 347 held in place by a snap ring 348 engaged in a groove in the sleeve 320.

Figure 2:
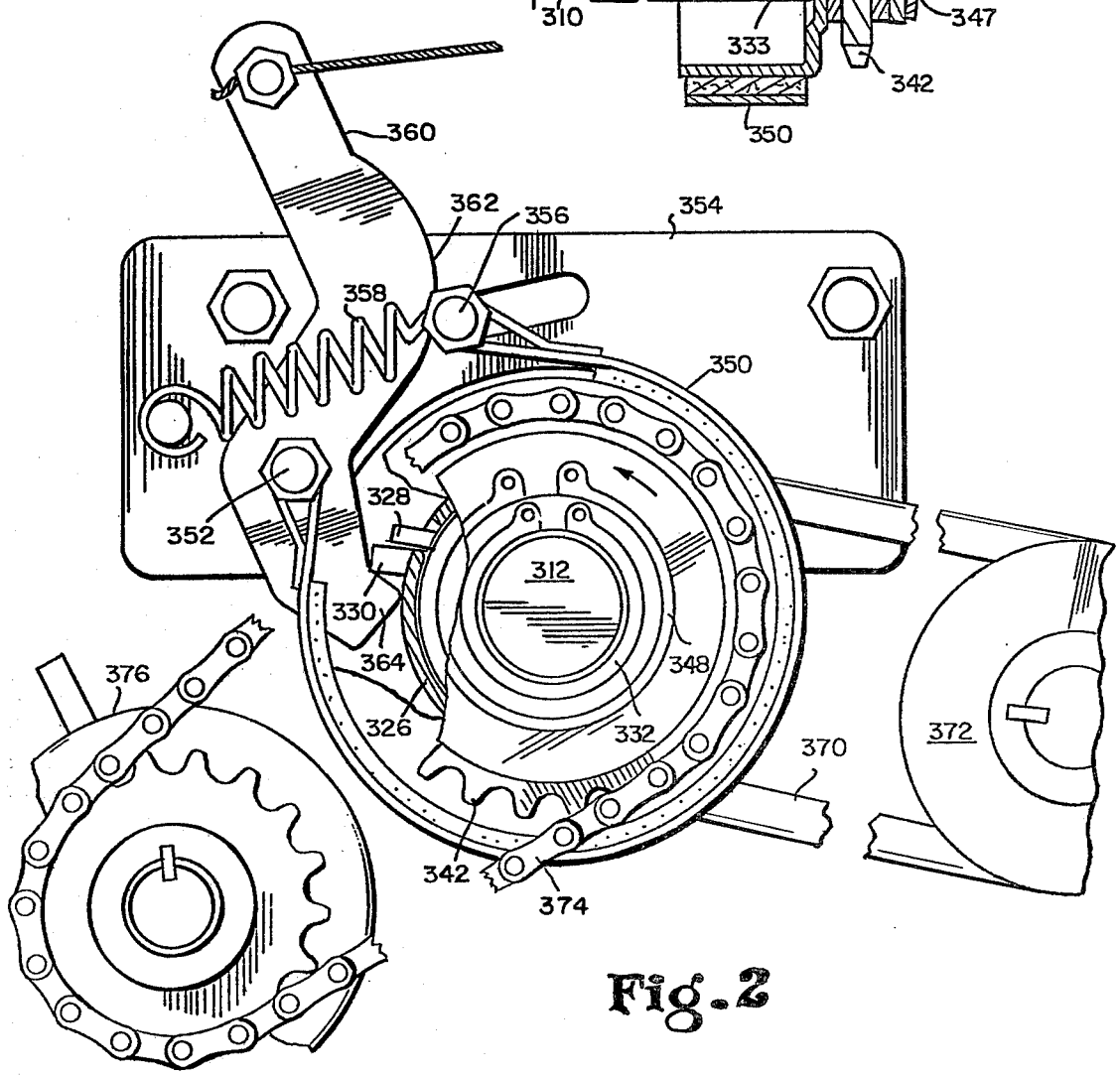
FIG. 2 is an end elevation of the clutch assembly shown in FIG. 1 with a diagrammatic showing of the application of that assembly to drive the wheels and blower blade of a snowblower.

A brake band 350 is engaged about the drum 336. One end of the band is anchored to a pin 352 on a mounting plate 354, and the other end is connected to a draw pin 356 which is pulled toward brake-applying position by a spring 358. A cam lever 360 is pivoted on the anchor pin 352 and has a cam face 362 arranged to force the draw pin 356 to a brake releasing position when the lever 360 is pulled clockwise as shown in FIG. 2. The opposite end of the lever 360 carries a clutch release finger 364 which, in the normal, brake-engaged position of the lever 360, lies in the path of the wing 330 on the clutch release collar 326 so as to stop the rotation of that collar and arrest the rotation of the tang 328 at the leading end of the clutch spring.

As shown diagrammatically in FIG. 2, the pulley groove 316 of the clutch assembly is connected by a belt 370 to a wheel drive pulley 372, and the sprocket 342 is connected by a chain 374 to a snowblower element, here shown as a paddle wheel 376.

Operation of this modification of FIGS. 1 and 2 is as follows. With the parts as shown, the brake 350 is held in braking engagement with the drum 336 by the spring 358, and the clutch release finger 364 lies in the path of the wing 330 to hold the clutch release collar 326 in non-rotating position, and this arrests the rotation of the tang 328 and the leading end of the spring. Rotation of the hub 310 then tends to unwind the spring 324 relative to its stopped leading end, and the spring is hence declutched from the hub clutch face 318. The driven elements of the clutch assembly, i.e., the sleeve 320 and the sprocket 342, then remain stationary, while rotation of the hub drives the belt 370. It is assumed that the drive train to the wheels contains suitable controls, e.g., a speed-responsive clutch at the engine, or a manual release in the belt-operated mechanism, so that propulsion of the vehicle is under appropriate control. The actuating lever 360 for the brake and clutch is assumed to be connected to a dead-man lever which is normally in release position and is manually actuated and held when it is desired to drive the snowblowing element 376. When the dead-man lever is thus actuated, it pulls the actuating lever 360 clockwise, and this causes the cam face 362 to thrust the draw pin 356 to the right and release the brake band 350 from the drum 336. Movement of the lever 360 also carries the clutch control finger 364 clockwise out of the path of the wing 330 and allows the clutch release collar to rotate freely. The leading end of the spring 324 then rotates with the hub 310 and the spring clutches the hub to the first driven member or sleeve 320, which is now released from the brake band 350. Engagement of the spring clutch transmits drive torque through the friction washers 344 to the sprocket 342, which transmits drive through the chain to the snowblowing implement 376. The frictional clutch drive from the sleeve 320 to the driven sprocket 342 through the frictional washers 344 limits the torque which is transmitted to the final driven member or sprocket 342, and this limits the torque which is imposed on the clutch spring 324 as that spring engages. Since the assembly is being driven at relatively low speed from a speed-reducing gear box 314, this torque limiting effect is adequate to prevent excessive shock loads which would damage or destroy the spring 324. Moreover, the torque limiting effect continues and is relatively constant throughout the operation of the snowblowing implement 376, so that if that implement should strike an obstruction which imposes a shock load on the driving train, the frictional clutch between the sleeve 320 and the sprocket 342 will absorb the shock and permit sufficient slippage to prevent imposing an excessive shock load on the clutch spring 324 or other parts of the drive train.

This clutch combination permits a desirable deadman control of the drive to the snowblowing implement 376, separate and independent from the propulsion drive of the snowblower vehicle from the pulley groove 316. The presence of the coil spring clutch as part of the dead-man control provides immediate interruption of the drive to the blowing implement when the dead-man control is released, so as to provide immediate stopping of that blowing element to prevent it from causing damage or injury. At the same time, the clutch combination provides a positive drive to that blower while also protecting the coil spring clutch and the rest of the drive train from excessive shock loads in the event the blower implement strikes an obstruction.

I claim:

1. A clutch assembly, comprising a driving hub adapted to be mounted on a drive shaft, having a cylindrical clutch face thereon, a shoulder at the end of the clutch face and a reduced portion therebeyond, a sleeve rotatably mounted on said reduced portion and against said shoulder, said sleeve forming a first driven member, having a cylindrical clutch face thereon adjacent to and aligned with the clutch face on the hub, having a shoulder beyond such clutch face and having a mounting portion beyond such shoulder, said hub reduced portion extending beyond said sleeve and having a retainer fixed thereon to retain the sleeve on the hub, a helical clutch spring engaged about said clutch faces and clutching the hub and sleeve together for forward drive, a brake rotor having an annular mounting flange mounted on said mounting portion and against the shoulder on said sleeve and non-rotatably engaged with said sleeve, such brake rotor mounting flange forming a fixed first pressure plate on said sleeve, a second driven member rotatably mounted on the mounting portion of said sleeve, a second pressure plate mounted thereon on the opposite side of said second driven member from said first pressure plate, and a frictional drive face between said first pressure plate and the opposed face of the second driven member, resilient thrust means for forcing said second pressure plate toward the first so as to frictionally clutch the first driven member to the second driven member, a retainer fixed on the sleeve in spaced relation with the shoulder thereon and trapping between itself and such shoulder the pressure plates, the second driven member, and said thrust means, and, means for declutching said helical spring clutch and for applying braking force to said brake rotor when the spring clutch is declutched.

* * * * *